United States Patent [19]

Rocha

[11] 3,780,572

[45] Dec. 25, 1973

[54] ULTRASONIC INSPECTION APPARATUS

[75] Inventor: Henry A. F. Rocha, Schenectady, N.Y.

[73] Assignee: General Electric Company, Schenectady, N.Y.

[22] Filed: Sept. 18, 1972

[21] Appl. No.: 290,253

Related U.S. Application Data

[63] Continuation of Ser. No. 156,226, Jan. 24, 1971, abandoned.

[52] U.S. Cl............ 73/67.5 R, 340/5 MP, 73/67.7, 73/67.9
[51] Int. Cl........................................... G01n 29.04
[58] Field of Search...................... 73/67.5 R, 67.6, 73/67.7, 67.8 R, 67.8 S, 67.9; 340/5 MP; 178/DIG. 18

[56] References Cited
UNITED STATES PATENTS
2,883,860 4/1959 Henry.................................. 73/67.9
3,461,420 8/1969 Silverman........................ 73/67.7 X

OTHER PUBLICATIONS

J. F. Sayers, The Future of Ultrasonic Cameras in Industrial Inspection Ultrasonics, April 1966, pg. 2 & 93.
P. S. Green, et al., Acoustic Imaging in a Turbid Underwater Environment, J.A.S.A., Dec. 1968, Vol. 44, No. 6, p. 1719–1730.
S. O. Harrold, Solid State Ultrasonic Camera, Ultrasonics, April 1969, p. 95–98.

Primary Examiner—Richard C. Queisser
Assistant Examiner—John P. Beauchamp
Attorney—John F. Ahern et al.

[57] ABSTRACT

Acoustic echo pulses from an object under observation are converted into a visual image by means of an acoustic image converter member. A piezoelectric plate for converting acoustic energy into electrical energy is located on one side of the member and an array of light emitting elements is located on the opposite side of the member. An array of amplifier and signal conditioning channels is located between the piezoelectric plate and the array of light emitting elements. Each channel has an input connected to a respective point on the piezoelectric plate and an output connected to each of the amplifier and signal conditioning channels for periodically rendering each of the channels conductive to pass electrical signals after a first predetermined interval of time from a periodically occurring zero reference time and for maintaining conduction in the channels for a second predetermined interval of time.

15 Claims, 13 Drawing Figures

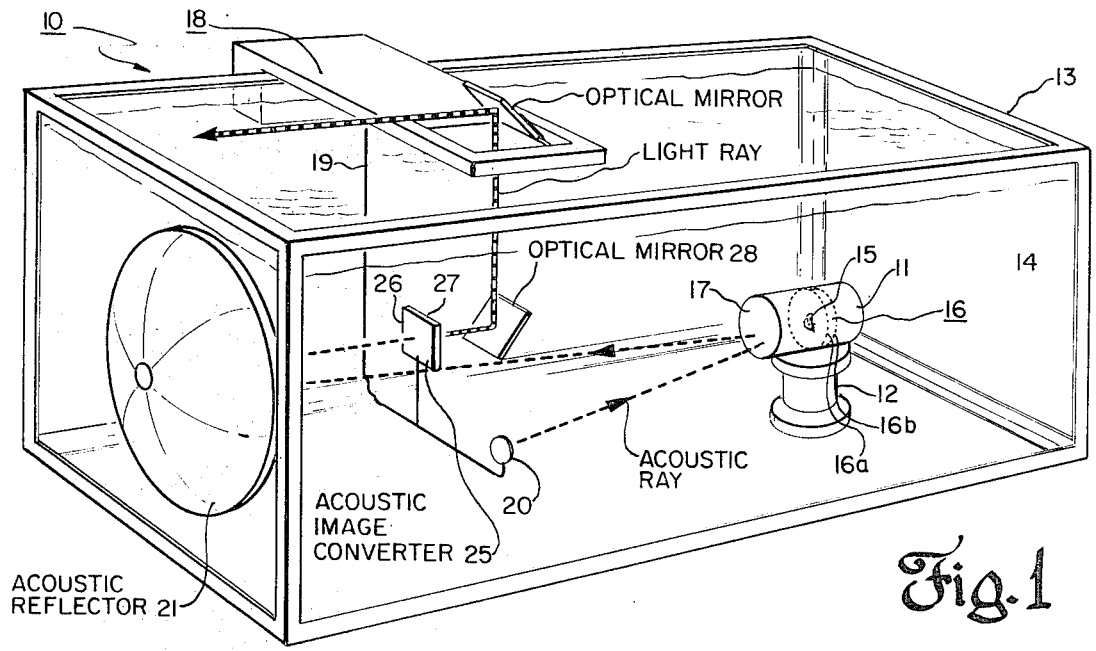
Fig. 1
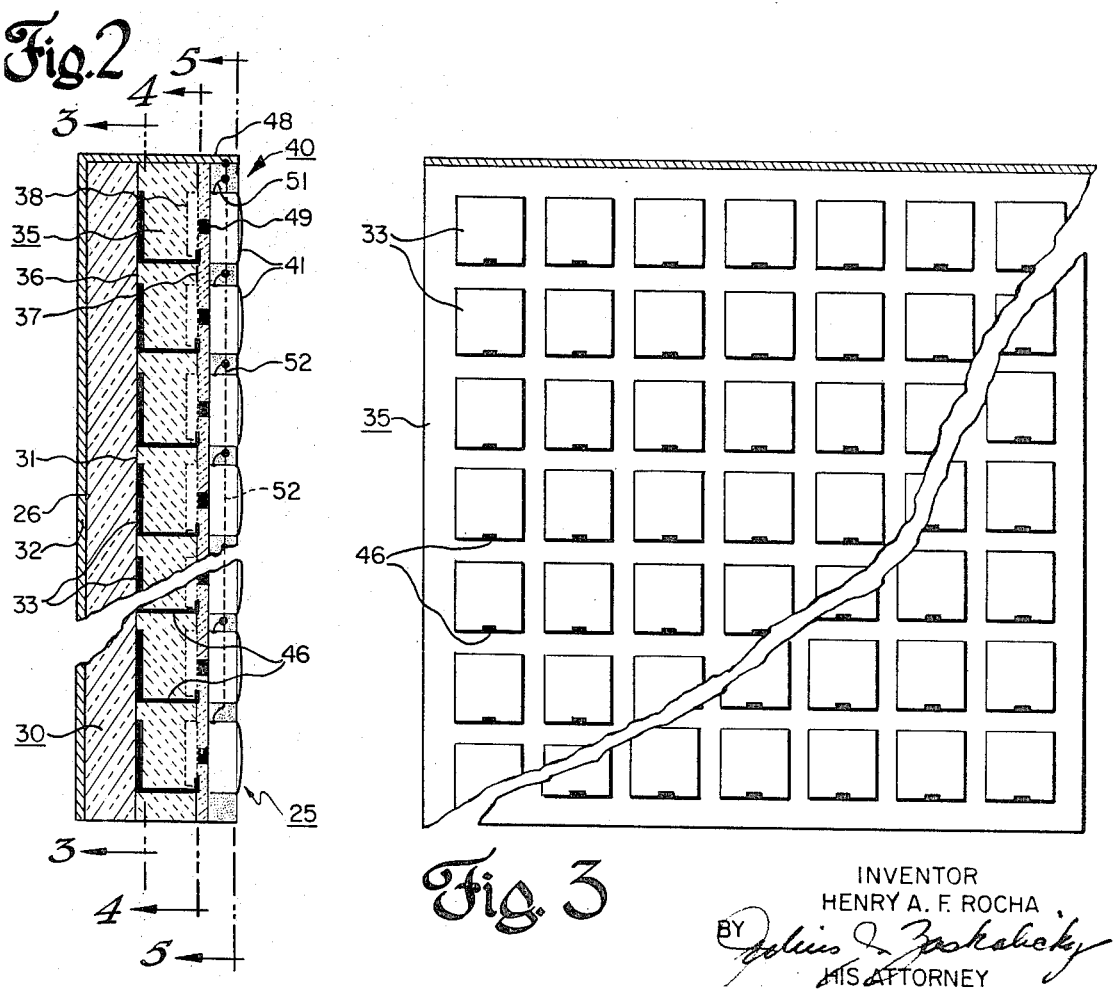
Fig. 2
Fig. 3
INVENTOR
HENRY A. F. ROCHA
BY
HIS ATTORNEY

INVENTOR
HENRY A. F. ROCHA

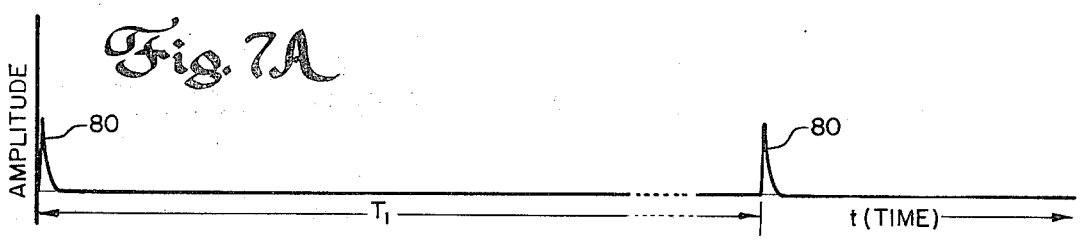
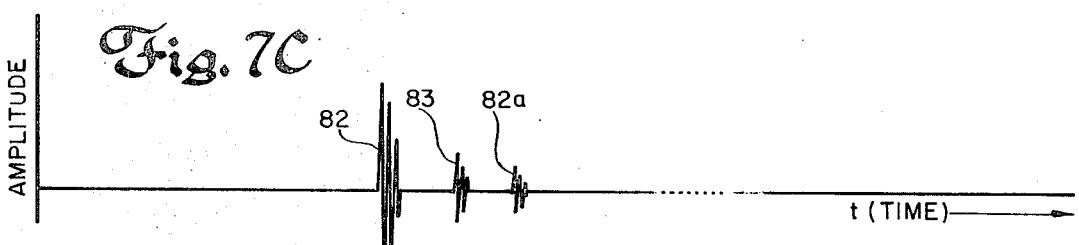
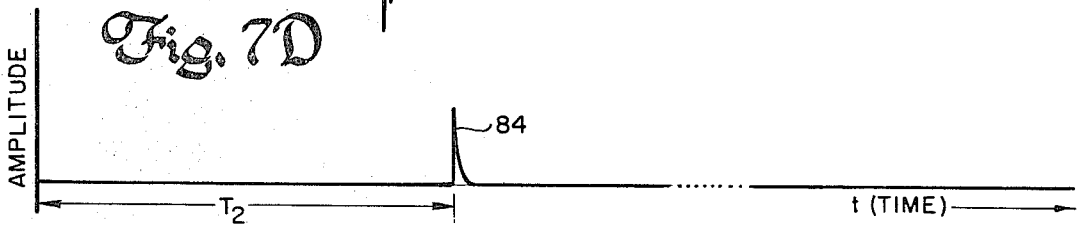
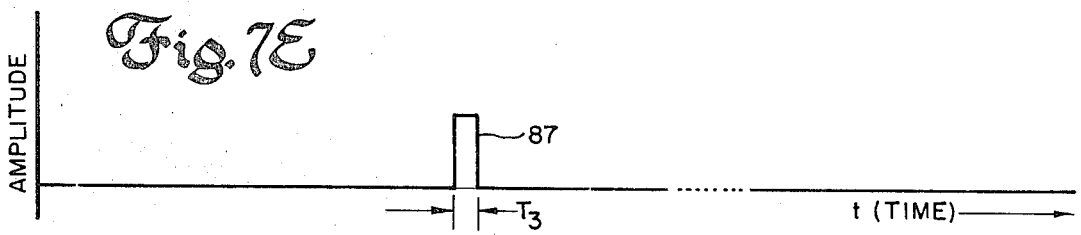
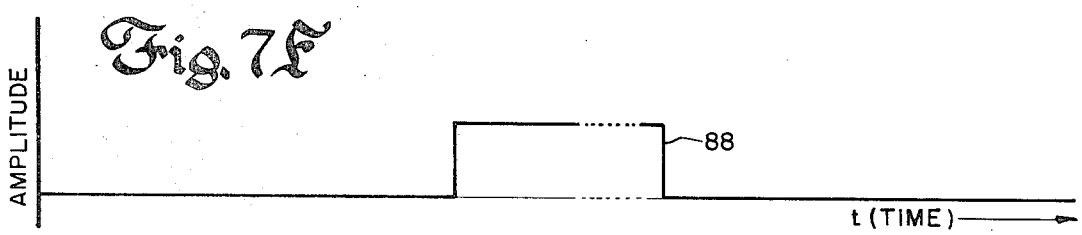
INVENTOR
HENRY A. F. ROCHA

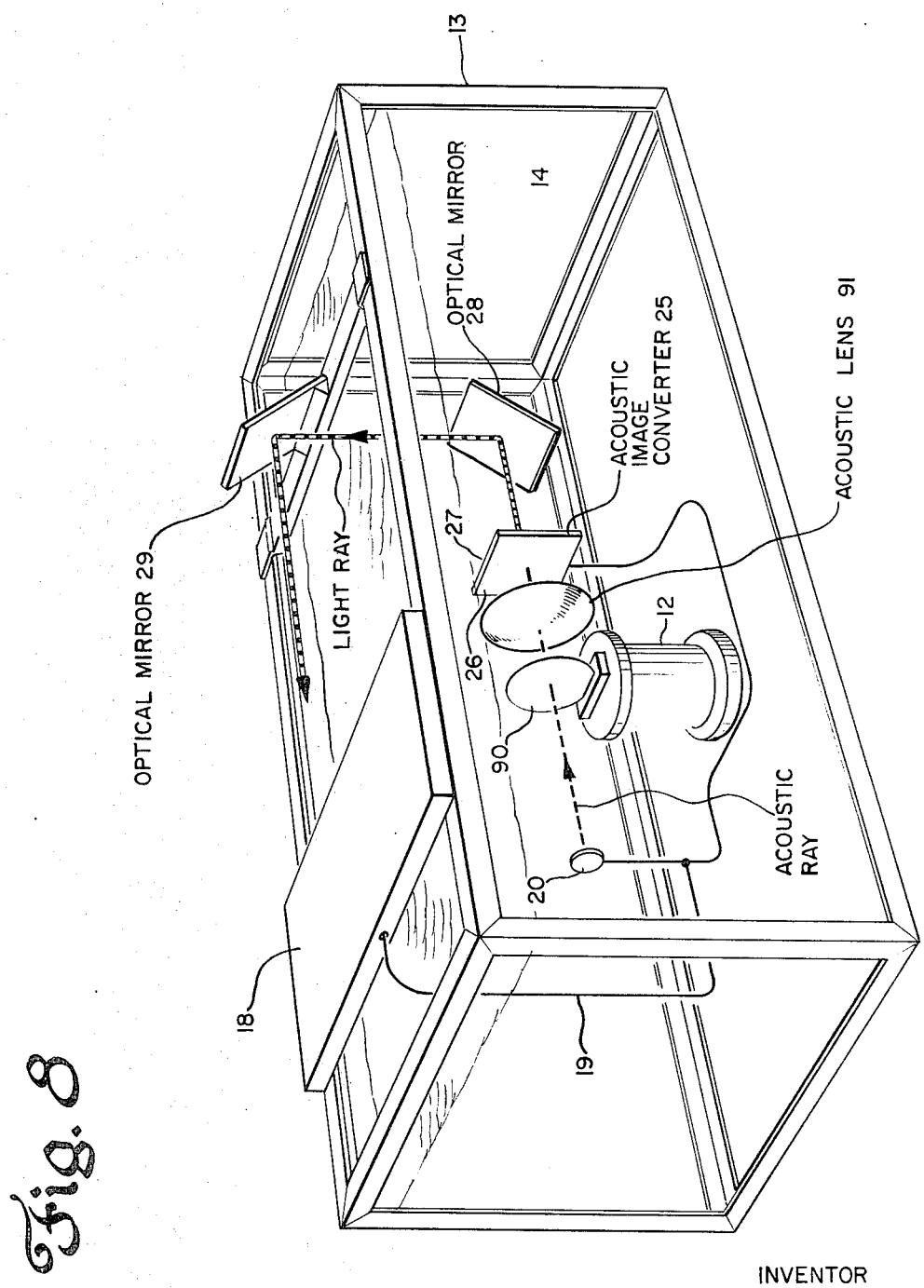

ULTRASONIC INSPECTION APPARATUS

This is a continuation of application Ser. No. 156,226, filed June 24, 1971; now abandoned.

The present invention relates to acoustic visualization and more particularly to method and apparatus to visualize the shape and dimensions of objects and in addition to visualize the shape, dimensions and location of internal discontinuities. The invention is useful in the examination of biological tissues and organs, in the inspection of structural objects for flaws, in the location and identification of objects underwater and in the dimensional checking of parts in a manufacturing cycle.

U.S. Pat. No. 2,164,125 discloses that objects can be inspected by acoustic means and that an acoustic field can be visualized by an image converter referred to as the Sokolov converter. The Sokolov converter, however, suffers from three basic limitations:

1. It operates as a continuous-wave system and is therefore subject to large interference patterns produced by standing waves within the object and in the coupling medium. Since it cannot discriminate in the time domain it is usually limited to inspection by transparency, and cannot be used for visualization in depth.
2. Because the converter is a vacuum device the size of the piezoelectric window used therein is limited by mechanical considerations and therefore its total resolution, i.e., the total number of resolved points, is necessarily limited.
3. Sensitivity is limited by the thermal noise of the scanning electron beam of the vacuum device. In systems disclosed in the prior art, such as U.S. Pat. No. 2,957,340 Rocha and U.S. Pat. No. 3,213,675 Goldman, the basic limitation of the Sokolov converter enumerated first above is avoided. The present invention is directed to overcoming the other enumerated limitations of the Sokolov converter as well as other limitations in prior art techniques and apparatus.

Accordingly, an object of the present invention is to provide an improved method and apparatus for acoustic imaging.

Another object of the present invention is to provide a method and apparatus for acoustic imaging of the interior of solid objects whereby the size, shape, and location of discontinuities or heterogeneities in such objects may be readily detected.

Another object of the present invention is to provide an improved acoustic image converter.

Another object of the present invention is to provide a converter to convert an acoustic pressure field into an optical display which can be directly and continuously observed.

Another object of the present invention is to provide a simple, compact and high resolution acoustic image converter.

In carrying out the invention as applied to an illustrative embodiment thereof, there is provided a piezoelectric plate having a pair of opposed surfaces, one of the surfaces having a conducting coating, the other of the surfaces having a plurality of discrete contacts whereby acoustic stresses applied between the opposed surfaces of the plate produce voltages between the contacts and the coating. The voltage appearing between each contact and the coating varies with the stress applied therebetween. A plurality of light emitting elements are provided each of which emits light in response to an applied electrical signal. The elements are equal in number to the number of contacts on the piezoelectric plate and are arranged in an array similar to the array of contacts on the plate in a plane parallel to the plane of the piezoelectric plate. A plurality of electrical signal storage elements are provided equal in number to the number of light emitting elements. Each storage element has an output circuit connected to energize a respective light emitting element in accordance with the signal stored therein. A plurality of amplifying channels are also provided, each amplifying channel being connected between a respective contact on the piezoelectric plate and a corresponding signal storage element. Gating means are provided connected to each of the amplifier channels for periodically rendering each of the channels conductive to pass electrical signals after a first predetermined interval of time from a periodically occurring zero reference time and for maintaining conduction in the channel for a second predetermined interval of time.

The novel features which are believed to be characteristic of this invention are set forth with particularity in the appended claims. The invention itself, both as to its organization and method of operation together with further objects and advantages thereof may best be understood by reference to the following description taken in connection with the accompanying drawings in which:

FIG. 1 is a perspective view showing apparatus of the present invention and one method of use thereof to detect flaws in an object under test.

FIG. 2 is a side view of a section of the acoustic converter shown in FIG. 1 in accordance with the present invention.

FIG. 3 is a plan view taken along section 3—3 of FIG. 2.

FIG. 7A is a diagram showing the idealized output of the synchronizing pulse generator of FIG. 6.

FIG. 7B is a diagram showing the idealized output of the transmitting piezoelectric transducer of FIG. 6.

FIG. 7C is a diagram showing the idealized output of the receiving piezoelectric plate of FIG. 6.

FIG. 7D is a diagram showing the idealized output of the variable delay generator of FIG. 6.

FIG. 7E is a diagram showing the idealized output of the gating pulse generator of FIG. 6.

FIG. 7F is a diagram showing the idealized output of the signal conditioning and storage element of FIG. 6.

FIG. 8 is a perspective view of apparatus of the present invention showing another method of use thereof to detect flaws in an object under observation.

Figure 4:
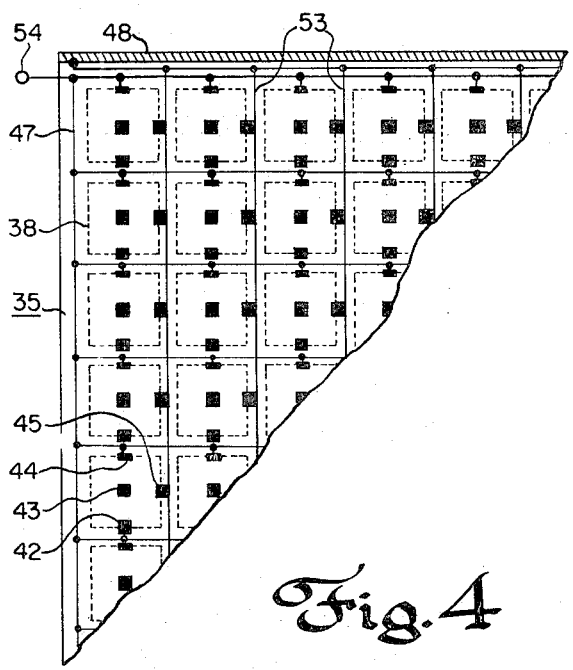
FIG. 4 is a plan view taken along section 4—4 of FIG. 2.
Figure 5:
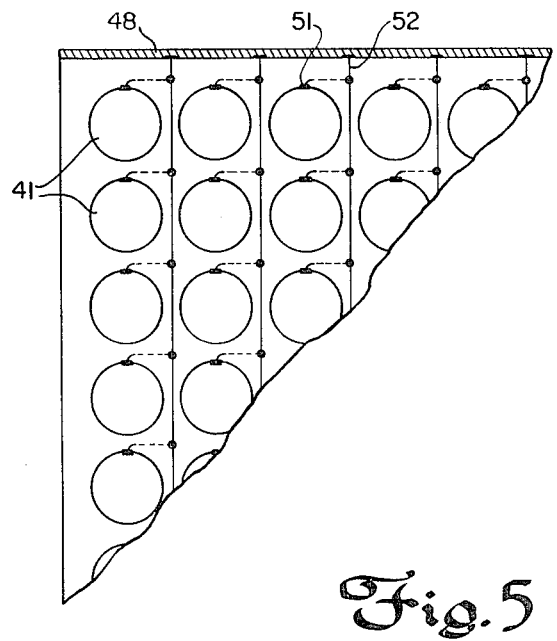
FIG. 5 is a plan view of the light emitting surface of the acoustic converter of FIG. 2.

Reference is now made to FIG. 1 which shows apparatus 10 utilizing acoustic waves for providing a visual image of the size, shape and location of a flaw or acoustic heterogeneity in an object 11. The object 11 is shown mounted on a positioner 12 at one end of a tank 13 which is filled with a suitable liquid 14, such as water. The object 11 has a flaw or acoustic heterogeneity 15 located within a planar region 16 bounded by opposed front and rear parallel faces 16a and 16b, shown in dotted outlines. By acoustic heterogeneity or discontinuity is meant a separation surface between two media having different acoustic impedances.

The apparatus 10 includes circuits, which are more particularly described in connection with FIG. 6 and which are incorporated in panel member 18 located on the top of tank 13, for generating trains or pulses of electrical waves. The pulses of electrical energy are applied over a cable 19 to an appropriate acoustic transducer 20 which, for example, may be a piezoelectric plate for converting electrical exciting waves into equivalent acoustic waves in the liquid medium 14 in the tank 13. The transducer 20 is arranged to direct the acoustic waves at the object 11 under test and in the test arrangement shown is located so as to direct the acoustic waves at the front face 17 of the cylindrical object 11. The apparatus 10 also includes an acoustic image forming or focussing means such as a reflector 21 located at the end of the tank 13 opposite from the end at which the object 11 is located and is adapted to receive the acoustic reflections from the object and form an image of such acoustic reflections at the focal plane thereof. An acoustic image converter 25 is located at the focal plane of the reflector 21 and converts a spatial distribution of the pressure of the acoustic reflections received at one face 26 thereof into a corresponding visual image at the opposite face 27 thereof. The visual image appearing on the opposite face 27 of the image converter is directed by mirrors 28 and 29 to an observer (not shown) located outside of the tank. Synchronizing and gating signals for converter 25 are generated in panel 18 and transmitted through multi-conductor cable 19.

Reference is now made to FIGS. 2, 3, 4 and 5 which show various views of the acoustic image converter 25 of FIG. 1. The acoustic image converter includes a piezoelectric transducer plate 30 which converts the pressure of the acoustic waves into electrical potential differences between the opposed faces 26 and 31 thereof. A semiconductor substrate member 35 is also provided having a pair of opposed faces 36 and 37, one of which is disposed adjacent to the face 31 of the transducer plate, for providing point-by-point amplification, detection and storage of the electrical signals appearing on the piezoelectric transducer plate 30. A light emitting transducer assembly 40 is also provided including an array of light emitting diodes 41 responsive to the electrical signals for providing small areas of light of intensities varying with the amplitudes of the electrical signals. The plate 30 which may be made of a material such as lead zirconate-titanate has a coating 32 of a metallic material on the outer face thereof. The opposite or internal face 31 of the plate 30 has a plurality of generally square metallic contacts 33 suitably bonded thereto. The contacts 33 are arranged in a plurality of columns and rows. Acoustic stresses applied between the opposed surfaces of the plate 30, for example, in the form of a spatial distribution of acoustic echoes produce voltages between the contacts 33 and the conductive coating 32 which vary with the acoustic stress applied, that is, voltage distribution is a representation of the distribution of the acoustic pressure on the face of the piezoelectric plate 30. The semiconductor substrate member 35 has one face 36 which is suitably bonded to the adjacent face 31 of the piezoelectric plate 30 and includes in the region adjacent the opposite face thereof a plurality of identical signal channels, one channel of which will be described in connection with FIG. 6, suitably formed in such region by techniques well known in the art. The signal processing channels are indicated by the dotted regions 38 in the semiconductor substrate members. Each of the channels 38 has an input terminal 42, an output terminal 43, a control or gating terminal 44, a ground terminal 45 and suitable power supply terminals (not shown). The number of channels 38 is equal in number to the number of contacts 33 on the piezoelectric plate. Each of the regions 38 in the semiconductor substrate member containing the signal processing channels is arranged in an array similar to the array of contacts 33, that is, an array consisting of a plurality of rows and columns. The input contacts 42 of each of the channels is connected to a respective adjacent contact 33 of the plate 30 by means of a conductor 46 extending through a hole in the semiconductor plate member 35. Each of the ground terminals 44 of the channels 38 is connected to an array of conductors 47 which is connected to a ground strip or bus 48, which in turn is connected to the conductive coating 32 on the plate 30 as can be clearly seen in FIG. 4. The light-emitting transducer assembly 40 includes a plurality of light emitting diodes 41 arranged in a plurality of rows and columns equal in number to the rows and columns of the contacts 33 to form an array which is similar to the array of the contacts 33. One terminal 48 of each of the diodes 41 is connected to the output terminal 43 of a channel of the semiconductor chip assembly and the other contact 51 of each of diodes 41 is connected to an array of ground conductors 52 which in turn are connected to ground bus 48. The gating terminal 45 of each of the channels is connected to an array of gating conductors 53 which in turn are connected to a control terminal 54. The function of the gating terminals 45 is to provide a means for periodically rendering each of the channels conductive to pass electrical signals after a predetermined interval of time from a periodically occurring reference time and for maintaining conduction in the channels for a second predetermined interval of time thereafter as will be more clearly understood from the diagram of FIG. 6 to which reference is now made.

Figure 6:
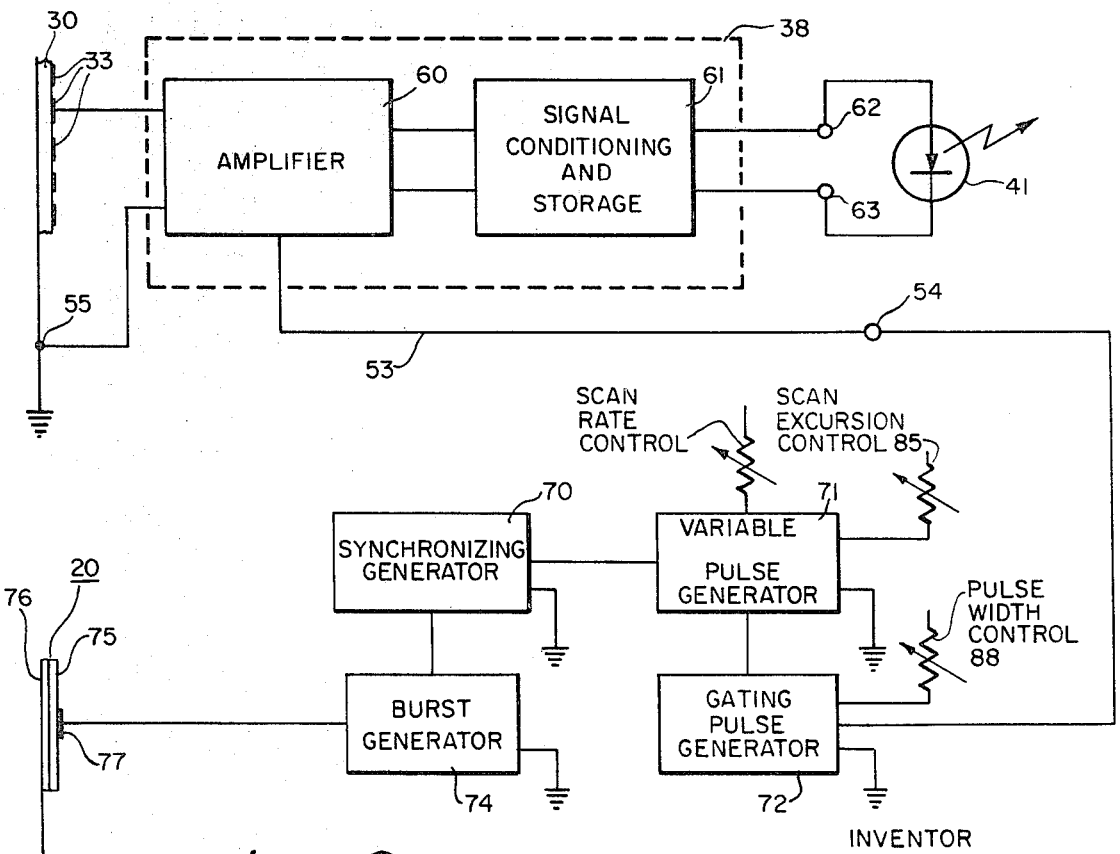
FIG. 6 is a diagram showing in block form a single channel connecting a contact of the piezoelectric transducer plate to a light emitting diode and also showing in block form the acoustic wave generation circuits used in the apparatus of FIG. 1.

FIG. 6 shows a receiving piezoelectric transducer plate 30 showing a single contact 33, a single light emitting diode 41, and a single signal processing channel 38 shown in the form of an amplifier element 60 and a signal conditioning and storage element 61 for providing amplification, detection and storage of the electrical signal appearing at the contact 33 and providing an output for driving the light emitting diode 41. Each of the other contacts 33 on plate 30 are identically connected to a respective light emitting diode 41 by a respective channel 38 identical to the channel described. The amplifier 60 includes a plurality of transistor amplifier stages connected in cascade to provide the desired degree of amplification of the signal appearing between the contact 33 and a ground point 55. The output of the amplifier is applied to a signal conditioning circuit in block 61 which may be in the form of a threshold response circuit for developing an output when the input exceeds a predetermined level. The output of the signal conditioning circuit is applied to a storage circuit whch may be in the form of a bistable multivibrator. The output of the storage circuit of element 61 appears across terminals 62 and 63. The light emitting diode 41 is connected between terminals 62 and 63. A gating conductor 53 for applying gating signals to the amplifier 60 is connected between a stage of amplifier 60 and gating terminal 54.

The gating terminal 54 is provided with a suitable gating pulse by gating pulse generator 72, in a manner which will be explained in connection with FIGS. 7A–7F. Also shown in FIG. 6 is a burst generator 74 for generating short bursts of electrical waves usually at frequencies in the range from 500 Kilohertz to 20 Megahertz. The burst generator 74 in response to the pulses from the synchronizing generator 70 produces bursts of electrical waves which are applied to the transmitting transducer 20 which converts the electrical waves into acoustic pressure waves in the liquid medium 14 of the tank 13. The transmitting piezoelectric transducer 20 includes a suitable piezoelectric plate 75 of a material such as lead zirconate-titanate, one face of which includes conductive coating 76 which is connected to ground and the other face of which has a contact 77 to which electrical energization is applied to develop pressure waves in the liquid medium.

Reference is now made to FIGS. 7A through 7F which show graphs of idealized waveforms appearing at various points in the circuit diagram of FIG. 6. In each of the graphs time is represented along the abscissa and amplitude is represented along the ordinate. FIG. 7A shows the waveform of the pulse output 80 from the synchronizing generator 70. Pulse 80 is of relatively short duration and occurs periodically at time intervals $T_1$. The output of the synchronizing generator 70 triggers burst generator 74 which causes transducer 20 to emit periodically a burst or train of acoustic waves 81 such as shown in FIG. 7B. The waveforms 82, 82a and 83 of FIG. 7C represent the electrical signals appearing between contact 33 and ground due to reflections respectively from the front surface, from the rear surface and from a flaw 15 in the body 11 of FIG. 1. As a certain time has elapsed from the point of entrance of the acoustic waves into the body 11 and travel to the flaw 15 and return, the time interval between the leading edges of waveforms 82 and 83 represents the time of travel of the acoustic energy from the face 17 of the cylinder 11 to the flaw 15 and back to the face 17. Similarly, the time period between the leading edges of waveforms 82 and 82a represents the time of travel of the acoustic energy from the front face 17 of cylinder 11 to the rear face thereof and return. FIG. 7D shows the trigger output 84 of the variable delay generator 71 triggered by the synchronizing pulse 80 from the synchronizing generator 70. The output 84 of the delay generator 71 is a trigger pulse having a delay $T_2$ in relation to synchronizing pulse 80, which delay may be varied by means of control element 85. The rate at which the period of the pulse 84 is varied is controlled by control element 86. The output of the delay generator 71 is applied to the gating pulse generator 72 which develops pulse 87 as shown in FIG. 7E having a leading edge in time coincidence with the leading edge of the pulse 84. Pulse 87 is of relatively short duration $T_3$ and is used for gating purposes, that is, for rendering the channels 38 conductive to pass electrical signals. The duration of the pulse 87 may be varied by means of control element 88. As the duration of $T_3$ is increased or decreased, the distance between the front and rear face of the planar region 16 under inspection is increased and decreased proportionally. The output of the gating pulse generator 72 is applied to the gating terminal 54 of the channel 38. The delay $T_2$ of the trigger pulse 84 from the delay generator 71 is set by the control element 85 so as to render the amplifier channel 38 conductive during time interval $T_3$ at the end of delay interval $T_2$. As the interval $T_2$ corresponds to the time of passage of the acoustic energy from transmitting transducer 20 to surface 16a and back, the signal 83 picked up by the transducer 30 and amplified by the amplifier of channel 38 would be allowed to pass through the amplifier, to be detected, and to be stored. The stored signal appearing at the output of the channel 38 is shown in the diagram of FIG. 7F as waveform 88. The amplitude of pulse 88 is a function of the acoustic pressure of the corresponding received pulse or echo of acoustic energy. The duration of the pulse 88 can be made as long as desired up to the limit set by period $T_1$ of the transmitted pulses 80. The output 88 of the channel 38 is applied to the light emitting diode 41.

In the operation of the apparatus of FIG. 1, the reflected acoustic energy from the object 11 and in particular from internal regions thereof, is focussed by the reflector 21 at the image plane thereof. Accordingly, the acoustic image converter 25 senses the pressure field produced by reflections from the object 11. The acoustic image converter 25 converts the acoustic pressure field into a visual field as each of the light emitting diodes provides a light output related to the voltage appearing at each contact 33 on the piezoelectric plate which, in turn, corresponds to the acoustic pressure being applied thereto. Such visual image of the acoustic field is reflected by mirrors 28 and 29 to an observer (not shown). Preferably, the separation of the opposed faces of the planar region is less than the depth of field of focus of the focussing means to provide good resolution of the heterogeneity under inspection. If desired, the object 11 under inspection may be periodically scanned from the front to the rear face thereof at a rate set by scan rate control to provide a composite view or pseudo-three-dimensional view of the internal structure of the body 11.

Reference is now made to FIG. 8 which shows apparatus for testing objects for acoustical heterogeneities in which the transmission properties of an object 90 for acoustical waves are utilized. The object 90 is shown as a thin wafer having a pair of opposed faces in which an acoustic flaw or heterogeneity (not shown) exists. The apparatus of FIG. 8 is similar to the apparatus of FIG. 1. An acoustic lens 91 is utilized in place of an acoustic reflector for focussing the acoustic rays. The other elements of the apparatus of FIG. 8 are identical to the correspondingly numbered elements of FIG. 1. The object 90 is mounted in a slot on a base member 92 which in turn is supported on a positioning member 12. The acoustic transducer 20 generates acoustic waves and is located on a central axis through the faces of the wafer 90 so as to radiate one face thereof with acoustic energy. The acoustic image converter 25 is also located on the axis on the opposite side of the wafer to receive transmissions of acoustic energy through the wafer. The acoustic image converter 25 converts a spatial distribution of the pressure of acoustic energy transmitted through the object and received at face 26 thereof into a corresponding visual image at the opposite face thereof. The visual image is directed by mirrors 28 and 29 to an observer (not shown) located outside of the tank.

The operation of the apparatus of FIG. 8 is similar to the operation of the apparatus of FIG. 1. The transducer 20 generates a burst of acoustic waves such as shown in FIG. 7B in the medium 14. The acoustic image converter 25 receives pulses of acoustic energy transmitted through the wafer as well as extraneous transmissions along a path or paths other than a path through the wafer. The time delay $T_2$ in FIG. 7B is set so as to produce a gating pulse such as gating pulse 87 of FIG. 7E to pass the transmissions from the transducer through the acoustic image converter which have traveled along a direct path and to exclude other transmissions. Accordingly, the visual image produced by the ultrasonic image converter 25 is free of extraneous reflections in the test apparatus and a visual indication is obtained of the transmission properties of the wafer and hence the existence of acoustic heterogeneities. The apparatus of FIG. 8 provides magnification or demagnification of the acoustic heterogeneity depending on the proportioning of the object and image distances of the acoustical lens system as well known to those skilled in the art.

While particular embodiments of the invention have been shown, it will, of course, be understood that the invention is not limited thereto since modifications both in the circuit arrangement and in the instrumentalities employed may be made. It is contemplated that the appended claims will cover any such modifications as fall within the true spirit and scope of this invention.

What I claim as new and desire to secure by Letters Patent of the United States is:

1. An acoustic image converter comprising
   a piezoelectric plate having a pair of opposed surfaces, one of said surfaces having a conducting coating and the other of said surfaces having a plurality of discrete contacts whereby acoustic stresses applied between said opposed surfaces of said plate produce electrical signals between said contacts and said coating, the electrical signal appearing between each contact and said coating varying with the stress applied therebetween,
   a plurality of light emitting elements, each element emitting light in response to an applied electrical signal, said elements being equal in number to the number of said contacts and being arranged similarly to the arrangement of said contacts in a plane parallel to the plane of said contacts,
   a plurality of electrical signal storage elements equal in number to the number of light emitting elements, each having an output circuit connected to energize a respective light emitting element in accordance with the signal stored therein,
   a plurality of amplifier channels, each amplifier channel connected between a respective contact on said piezoelectric plate and a respective signal storage element for storing electrical signals in said storage elements in accordance with the stresses applied to said plate,
   gating means connected to each of said amplifier channels for periodically rendering each of said channels conductive to pass electrical signals after a first predetermined interval of time from a periodically occurring zero reference time and for maintaining conduction in said channels for a second predetermined interval of time.

2. The combination of claim 1 in which said contacts are arranged in a plurality of rows and columns and said light emitting elements are arranged in corresponding rows and columns.

3. The combination of claim 1 in which said light emitting elements are arranged in an array in a plane closely spaced to said other surface of said opposed surfaces to form a panel, said one surface of said plate adapted to receive acoustic vibrations and said array of light emitting elements forming an optical image of the distribution of acoustic pressure on said plate.

4. The combination of claim 1 in which said light emitting elements are light emitting diodes.

5. Apparatus for visualizing an object and the heterogeneities contained therein comprising
   a generator of acoustic wave trains,
   means for directing said acoustic wave trains at the object to be examined,
   means positioned in relation to said object for focussing on a plane the acoustic wave trains emanating from a planar region of said object,
   an acoustic image converter for converting said acoustic wave trains focussed on said plane into a corresponding visual image, said acoustic image converter including a piezoelectric plate having a pair of opposed surfaces, one of said surfaces having a conducting coating and the other of said surfaces having a plurality of discrete contacts whereby mechanical stresses applied between said opposed surfaces of said plate produce electrical signals between said contacts and said coating, the electrical signals appearing between each contact and said coating varying with the stress applied therebetween, a plurality of light emitting elements, each element emitting light in response to an applied electrical signal, said elements being equal in number to the number of said contacts and being arranged similarly to the arrangement of said contacts in a plane parallel to the plane of said contacts, a plurality of electrical signal storage elements equal in number to the number of light emitting elements, each having an output circuit connected to energize a respective light emitting element in accordance with the signal stored therein, a plurality of amplifier channels, each amplifier channel connected between a respective contact on said piezoelectric plate and a respective light signal storage element for storing electrical signals in said storage elements in accordance with the acoustic stresses applied to said plate,
   gating means connected to each of said amplifier channels for rendering each of said channels conductive to pass electrical signals after a first predetermined interval of time after initiation of each of said acoustic wave trains and for maintaining conduction in said channels for a second predetermined interval of time after initiation of conduction in said channels.

6. The combination of claim 5 in which said focussing means is positioned in relation to said acoustic wave train directing means to receive acoustic reflections from said object whereby a spatial distribution of said reflections in the focal plane of said focussing means is formed.

7. The combination of claim 5 in which said focussing means is positioned in relation to said acoustic wave train directing means to receive acoustic transmissions from said object whereby a spatial distribution of said transmissions in the focal plane of said focussing means is formed.

8. The combination of claim 6 in which means are provided for periodically varying said first predetermined interval to periodically pass and display electrical signals corresponding to said acoustic wave trains focussed on said plane from respective planer regions of said object.

9. The combination of claim 6 in which means are provided for varying said second predetermined interval to provide a desired separation of the opposed planar surfaces of said planar region.

10. The combination of claim 6 in which the depth of field of said focussing means is greater than the distance between opposed planar surfaces of said planar region.

11. Acoustic imaging apparatus for visualizing selected regions of an object comprising generating means for producing a train of spaced electrical pulses, transmitting transducer means energized by said train of electrical pulses for producing a corresponding train of acoustical pulses that are directed toward the object being examined, focussing means for focussing acoustical energy reflected by the object and heterogeneities within the object, acoustic image converter means for converting said focussed reflected acoustical energy into a corresponding visual image of a selected region of the object, said acoustic image converter means including a piezoelectric plate having a pair of opposed surfaces, one of said surfaces having a conductive coating and the other surface having a two-dimensional array of contacts whereby acoustical energy incident on said piezoelectric plate produces electrical signals between said contacts and coating that vary with the magnitude of the incident acoustical energy, a plurality of signal processing channels each coupled to one of said contacts, each signal processing channel comprising an amplifier channel and a signal storage element for storing said electrical signals representative of the acoustical energy, and visual display means effectively coupled to the outputs of said signal processing channels to be actuated by the stored electrical signals, and gating means connected to each of said signal processing channels and to said generating means for periodically rendering each amplifier channel conductive for a selected time interval between consecutive electrical pulses produced by said generating means, to thereby produce an image on said visual display means of the selected region of the object.

12. The combination of claim 11 in which said two-dimensional array of contacts on said piezoelectric plate are arranged in a plurality of rows and columns, and said visual display means comprises an array of similarly arranged light emitting elements each coupled to the output of one of said signal processing channels.

13. The combination of claim 11 in which said gating means renders each amplifier channel conductive after a first predetermined interval of time after initiation of each electrical pulse and maintains conduction in said amplifier channel for a second predetermined interval of time after initiation of conduction in said amplifier channel.

14. The combination of claim 13 further including means for periodically varying said first predetermined interval of time to thereby produce images of regions of the object at different distances from said transmitting transducer means.

15. The combination of claim 13 further including means for varying said second predetermined interval of time to thereby adjust the depth of the selected region of the object being imaged.

* * * * *